June 17, 1924.
C. H. MORSE
1,498,108
LIQUID MEASURING APPARATUS
Filed Dec. 18, 1920   2 Sheets-Sheet 1
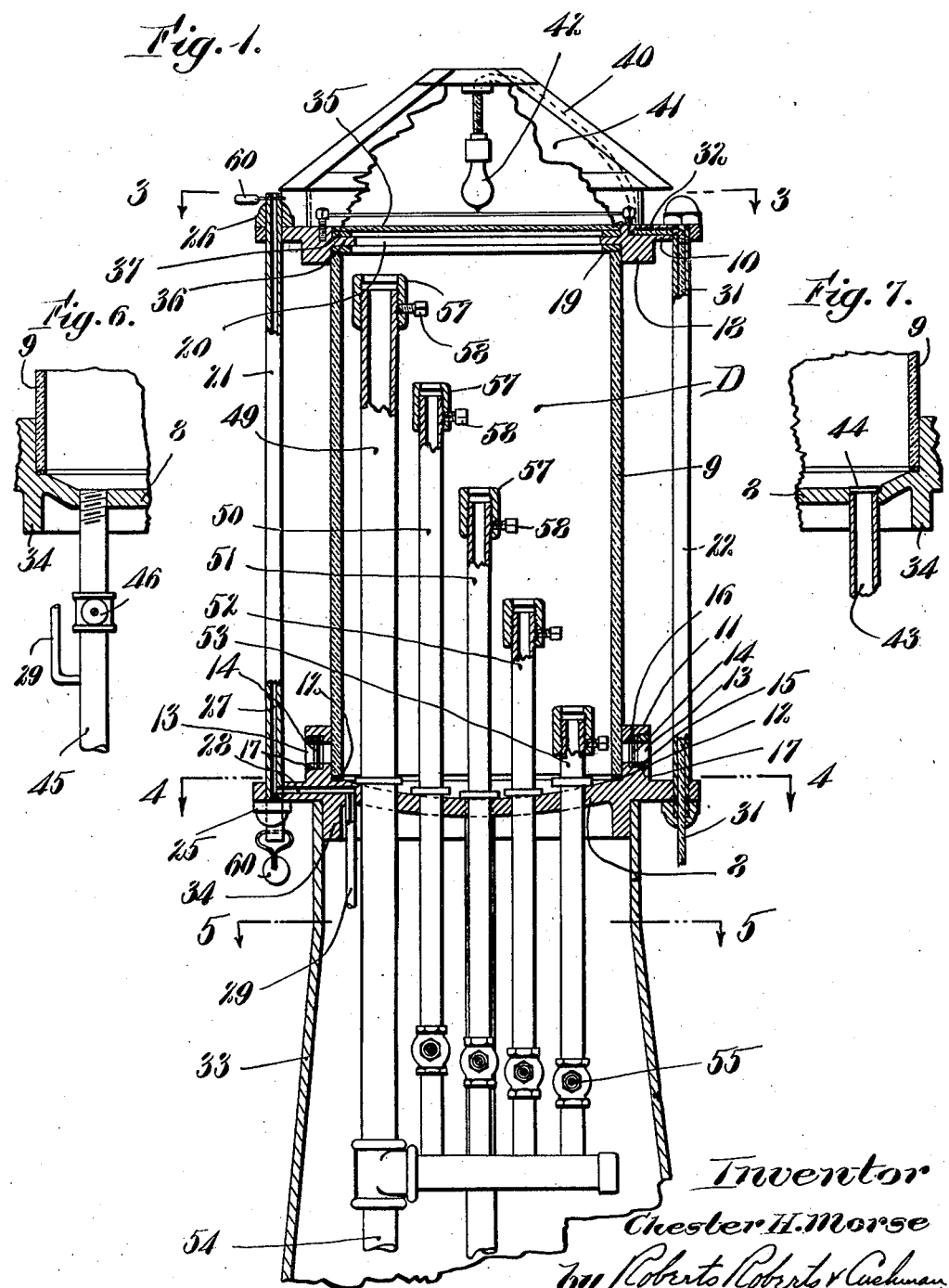

June 17, 1924.
C. H. MORSE
LIQUID MEASURING APPARATUS
Filed Dec. 18, 1920    2 Sheets-Sheet 2
1,498,108
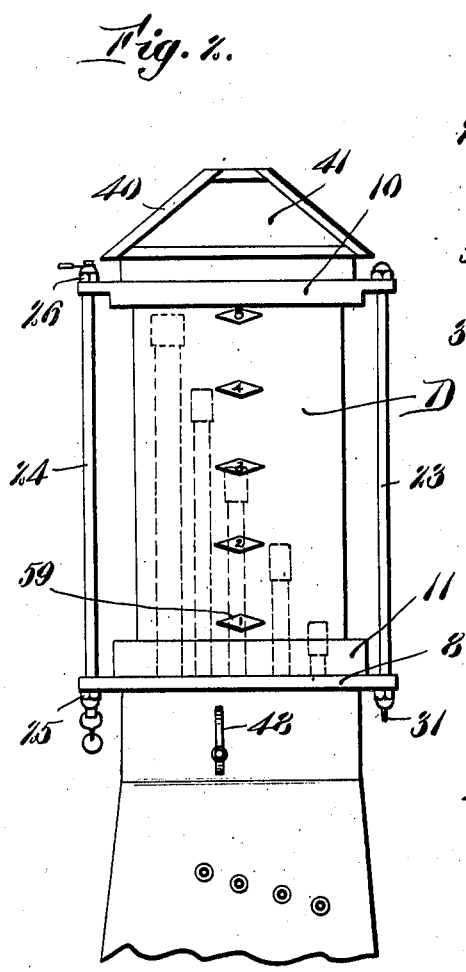
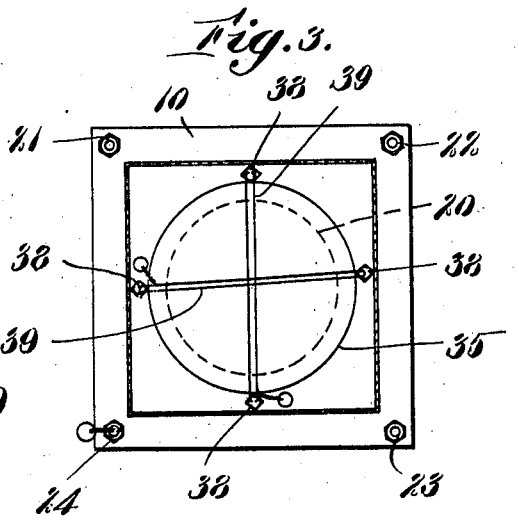
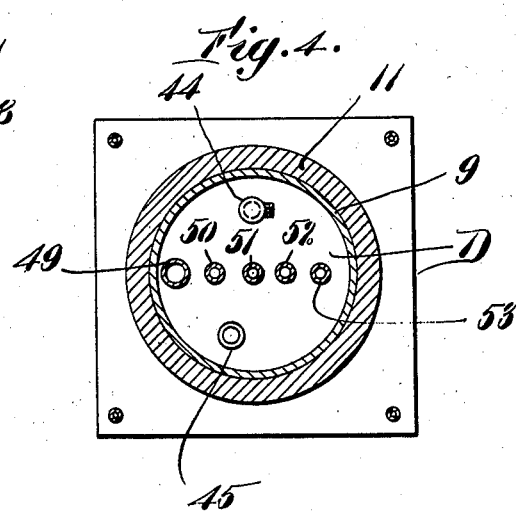
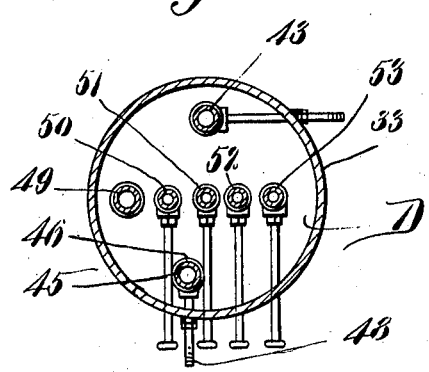
Inventor
Chester H. Morse
by Roberts Roberts & Cushman
attys.

Patented June 17, 1924.

1,498,108

UNITED STATES PATENT OFFICE.

CHESTER H. MORSE, OF TAUNTON, MASSACHUSETTS.

LIQUID-MEASURING APPARATUS.

Application filed December 18, 1920. Serial No. 431,685.

*To all whom it may concern:*

Be it known that I, CHESTER H. MORSE, citizen of the United States of America, and resident of Taunton, in the county of Bristol and State of Massachusetts, have invented new and useful Improvements in Liquid-Measuring Apparatus, of which the following is a specification.

This invention relates to dispensing apparatus for liquids, particularly of the type wherein a definite measured quantity is fed into a container from which the liquid is to be drained. Apparatus of this nature, to be accurate and dependable, must necessarily be simple and free of moving parts; these conditions demand a simple vessel for measuring the liquid.

The problem then lies in making certain that the correct quantity of liquid to be dispensed is in the vessel. If graduations on the vessel alone be depended upon, it is evident that the quantity can be varied within very appreciable limits and still appear correct, particularly in a device that is large enough to measure from one to ten gallons, such as the gasoline trade requires. Some additional means is then demanded for accurately determining the quantity in the vessel.

It is not sufficient, however, that such a quantity determining means is capable of giving accurate measure. It must also be of such a nature that it can not be manipulated by the dealer to deceive the purchaser; for if it is under his control he can tamper with the adjustments to deprive his customers without any danger of detection.

The principal objects of this invention are to provide accurate quantity determining means which can not be altered by the dealer; to provide a device of this nature which can be adjusted to give accurate measures; to provide such a device which can be sealed with the assurance that the adjustments can not be changed; and to provide a device that will measure different quantities. In addition, this invention has for its objects the provision of means insuring ready flow from the vessel for rapid drainage. Further objects will appear from the disclosure which follows.

The most suitable means for insuring an accurate quantity of liquid in a vessel has been found to be an overflow for liquid that is in excess of the required amount. Such an overflow means is therefore adopted in the embodiment here chosen for illustration. However, this overflow is so arranged that it can not be altered in any way by the dealer. Therefore a full measure of liquid is delivered when the vessel is drained.

To deliver variable quantities a graduated series of overflow is provided, one overflow for each of the measures required. These overflows are enclosed in a vessel made with transparent walls, so that the liquid may be seen and the customer assured as to the quantity delivered. The upper end of the vessel is sealed air-tight by a removable cover which when removed permits free access to the interior, but its removal is prevented by a seal which is applied for example by a government official. As long as this seal is intact the interior of the vessel can not be reached. Each of the overflows is adjustable within the vessel so that at the time of sealing their height can be regulated, and the various quantities which the apparatus delivers accurately fixed. As an additional precaution the separable parts forming a vessel may be provided with seals or otherwise secured against separation. Rapid and ready delivery of all liquid in the draining means is provided by having an air connection to the draining means just below the outlet valve, so that the air has ready access and prevents the formation of a partial vacuum, which would retain the liquid.

In the accompanying drawings,—

Figure 1 is a vertical section of the dispenser;

Figure 2 is an elevation;

Figure 3 is a horizontal section on the line 3—3 of Fig. 1;

Figure 4 is a horizontal section on the line 4—4 of Fig. 1;

Figure 5 is a horizontal section on the line 5—5 of Fig. 1;

Figure 6 is a vertical section through the outlet pipe; and

Figure 7 is a vertical section through the inlet pipe.

In the particular embodiment chosen for the purpose of illustration, the dispenser comprises the vessel D formed by the bottom plate 8, glass cylindrical wall 9, and top plate 10. The plate 8 has an upstanding annular flange 11 closely surrounding the lower end of the glass wall 9. A packing 12 of cork or the like between the plate and the lower end of the cylinder seals the cylinder. Within the flange 11 is formed side openings 13. A sight glass 14, with packing rings 15 and 16, is secured in each of these openings by a collar 17. The upper plate 10 has an annular portion 18 encircling the upper edge of the glass wall, a packing ring 19 being inserted between the wall and this plate. The plate 10 is provided with an opening 20 giving ready access to the interior of the vessel. These plates 8 and 10 are shown square in plan and posts 21, 22, 23 and 24 pass through their corners. Each of these posts is secured by nuts 25 and 26 (Fig. 1) and outside the nuts seals 60 are applied to the posts to prevent unauthorized opening of the vessel. The post 21 has an interior passage opening at its upper end to the atmosphere and connecting with another passage 28 formed in the bottom plate 8 and thence with a small pipe 29. Another post 22 has an axial passage for the lamp cord 31 communicating with a passage 32 leading to the lamp compartment.

The vessel so formed by the plates and the wall is supported on the casing 33 and secured thereto by a flange 34 depending from the plate 8.

The opening 20 in the upper plate 10 is normally closed by a glass plate or closure 35 supported on a ledge 36 provided about the opening periphery, cork packing 37 being inserted between the glass and the ledge. This glass permits light to pass into the vessel and also gives ready access to the interior of the vessel by its removal. To prevent such removal without detection small bolts 38 (Fig. 3) are threaded into the plate 10 and a wire or wires 39 are passed through holes in these bolts and the ends of the wire sealed. These bolts are sufficient in number to prevent lateral removal of the closure. The result is that these bolts can not be removed or the glass removed without first removing the wire. A lamp house or canopy 40 is placed over the glass plate 23 shown in Fig. 1. This may be provided with glass panels 41 and within the canopy is suspended a light 42 connected to the wire 31 above mentioned.

The vessel is supplied with liquid from a feed pipe 43 entering through the bottom plate 8. A check valve 44 prevents return of liquid through the pipe. Liquid is discharged from the vessel through the pipe 45 and the bottom of the vessel may be sloped toward this pipe. In this outlet pipe is a valve 46 of a type that is normally closed by a spring and opened by a handle 48. Below the valve 46 the outlet pipe is connected to the small pipe 29 (Fig. 6) and as this pipe is open to the atmosphere the air has free access to the outlet pipe. Consequently there is no tendency to retain any liquid by the formation of a partial vacuum.

Extending through the bottom plate 8 of the vessel are a series of overflow pipes 49, 50, 51, 52 and 53. These pipes are provided with collars 61 fast thereto immediately above the bottom plate so that the pipes can not be lowered below their proper portions. The overflow pipes are connected below the vessel with a pipe 54 which communicates with a supply tank. A valve 55 of a type normally closed by a spring is provided for each of these pipes except the highest one, the valve having an operating handle 56. The highest overflow (49 in the five gallon illustration) having no valve permits air to pass out of the vessel while being filled.

The upper ends of these pipes within the vessel are supplied with adjustable heads 57 which may be made of couplings threaded to the pipes and which may be secured in adjusted position by set screws 58. Each of these pipes is adjusted to overflow when a definite quantity of liquid has been supplied to the vessel. Thus, as indicated by the markers shown in Fig. 2, the pipes overflow at 1, 2, 3, 4 and 5 gallons respectively. For example, if three gallons is required, the overflow pipe 51 is opened (the others being closed), and liquid is fed into the vessel till it overflows through pipe 51. With the liquid standing at the level of overflow 51 the vessel contains exactly 3 gallons and this measured quantity may then be delivered through the outlet 45; if 5 gallons is required, the overflow 49 is opened; etc.

From the foregoing it will be apparent that different amounts may be visibly measured by means disposed wholly within the glass vessel, the means being so enclosed and sealed that it can not be tampered with to short measure a customer.

The unique method of illumination renders the contents of the vessel clearly visible at all times.

I claim:

1. An apparatus of the class described comprising a bottom member, an annular flange upstanding therefrom, said flange having a sight opening therethrough, a transparent cylindrical shell having one end seated within the flange member, a cover engaging the opposite end of said shell and means for securing said bottom and cover in operative relationship.

2. Liquid measuring apparatus comprising a transparent vessel open at the top and bottom, covers for said openings, rods connecting said covers, one of said rods being hollow, a drain extending from the bottom cover, and an air duct connecting said drain with said hollow rod, whereby said drain communicates with the atmosphere at a point above the level of the liquid in the vessel.

3. A device of the character described including a base portion, a tank section mounted thereon and a cap member for the tank, there being a plurality of hollow rods connecting and securing together the base and the cap for the tank, electric connections extending through one of said hollow rods for controlling illumination of the tank, an outlet pipe for the tank, and connections between another of the hollow rods and said outlet wherebey said rod provides an air passage to the outlet extending above the tank.

4. A device of the character described including a metallic base member having an upstanding annular flange, a transparent tank-forming wall rising from the base member and enclosed by the flange, a cap for said wall, a transparent closure plate secured in position by said cap and an illuminating device carried by the cap for directing illumination through the removable closure plate into the transparent container.

5. A device of the character described including a metallic base member having an upstanding annular flange, a transparent tank-forming wall rising from the base member and enclosed by the flange, a cap for said wall, a transparent closure plate secured in position by said cap and an illuminating device carried by the cap plate for directing illumination through the removable closure plate of the wall into the transparent container, the upstanding flange having apertures formed therein substantially on a level with the bottom of the tank and interiorly closed by the transparent wall whereby said apertures permit of viewing of the illuminated bottom of the tank as the same is emptied.

Signed by me at Taunton, Massachusetts, this thirteenth day of December, 1920.

CHESTER H. MORSE.